United States Patent [19]

Singer et al.

[11] Patent Number: 4,508,289
[45] Date of Patent: Apr. 2, 1985

[54] ROLL-UP DEVICE FOR SAFETY BELTS

[75] Inventors: Klaus-Peter Singer, Hamburg; Klaus Butenop, Herzhorn, both of Fed. Rep. of Germany

[73] Assignee: Autoflug GmbH, Rellingen, Fed. Rep. of Germany

[21] Appl. No.: 336,177

[22] Filed: Dec. 31, 1981

[30] Foreign Application Priority Data

Dec. 31, 1980 [DE] Fed. Rep. of Germany ....... 3049564

[51] Int. Cl.³ .................... A62B 35/02; B65H 75/48; B65H 75/42; B60R 21/10
[52] U.S. Cl. .................... 242/107.4 B; 280/806; 297/478; 297/480
[58] Field of Search ................... 242/107.12, 107.4 A, 242/107.4 B, 107.4 C, 107.4 D, 107.4 R, 107.4 E, 107.6, 107.7; 280/806; 297/478, 480

[56] References Cited

U.S. PATENT DOCUMENTS

| 1,264,636 | 4/1918 | Green | 242/107.7 |
|---|---|---|---|
| 2,375,917 | 5/1945 | Gross | 242/107.7 |
| 2,708,555 | 5/1955 | Heinemann et al. | 242/107.4 A |
| 3,211,496 | 10/1965 | Zaydel | 242/107.12 |
| 4,077,585 | 3/1978 | Wiesbock | 242/107.4 B |
| 4,101,092 | 7/1978 | Schmelow et al. | 242/107.4 B |
| 4,148,446 | 4/1979 | Sugar | 242/107.4 A |
| 4,168,810 | 9/1979 | Sack et al. | 242/107.4 A |
| 4,215,830 | 8/1980 | Cunningham | 242/107 |

FOREIGN PATENT DOCUMENTS

| 1033701 | 6/1978 | Canada | |
| 2823334 | 12/1979 | Fed. Rep. of Germany | 242/107.4 B |
| 2454310 | 11/1980 | France | 242/107.4 A |
| 1517716 | 7/1978 | United Kingdom | |

Primary Examiner—Harvey C. Hornsby
Assistant Examiner—Scott J. Haugland
Attorney, Agent, or Firm—Becker & Becker, Inc.

[57] ABSTRACT

A roll-up device, particularly for safety belts used in vehicles. The device provides a so-called automatic belt blocker with belt-sensitive and/or vehicle-sensitive blocking of the belt winding spindle, which is provided with a projection which cooperates with a locking member, which in turn can be locked in place via detents which engage with notches associated with a housing. There is the problem that, in the event of high belt forces, the locking member will slip away from the projection, and thus from the notches of the housing, thereby freeing the blockage. The aim of the invention is therefore to prevent the locking member from breaking out of its predetermined position in this way. To solve this problem, at least one overlapping arrangement is provided between the projection of the belt winding spindle, and the radially deflectable locking member, to ensure that the locking member does not move out of its position in the axial direction of the belt winding spindle during blocking. The overlapping arrangement preferably includes an opening in the projection, and protrusions on the locking member, which protrusions engage in the opening. The entire locking member may also pass through the opening. The invention has the advantage of locking the locking member in position not only radially, but also axially.

18 Claims, 10 Drawing Figures

ROLL-UP DEVICE FOR SAFETY BELTS

The present invention relates to a roll-up device for safety belts, particularly in motor vehicles, and provides automatic blocking of the belt winding spindle in the event of accelerations exceeding a threshold value acting on the belt and/or on the support for the device, e.g. the vehicle; the belt winding spindle comprises, at one end, a projection which preferably engages in a central opening which permits at least two different operating positions, this opening being provided in a radially deflectable locking member which can be locked in position by means of at least one detent which engages notches associated with the housing.

In a known roll-up device of this kind (British Pat. No. 1517716), which is also known in the art as an automatic belt blocker, the locking member with its detents is constructed as a ratchet wheel or toothed disc stamped out of sheet steel, with the central opening being keyhole-shaped. The projection on the belt winding spindle also has a keyhole-shaped contour which fits into the central opening in the toothed disc, but is narrower in the region of the key bit, so that the projection can occupy two operating positions within the toothed disc, namely a rest position in which the belt roll-up or reeling device is not blocked, and a locking position which holds the belt winding spindle motionless so that the belt cannot be pulled out any further and the person strapped in is held by the belt. The principle of this type of construction consists in the radial direction of movement of the locking member or toothed disc, in relation to the axis of the belt winding spindle, during transition from the rest position to the blocking position; numerous variations and developments of this principle have been tried. The basic embodiment is shown in German Pat. No. 1456115.

Experience has shown that when particularly high belt forces occur in the event of a crash, together with certain features of the behavior of the material of the blocking elements in belt rollers of the kind described, a phenomenon may occur which is known as "breaking out of the ratchet wheel" and which is aided or initiated by deformation of the load-bearing parts of the apparatus, particularly by warping of the housing. This means that the ratchet wheel (the locking member) moves out of its prescribed position, at right angles to the axis of the belt winding spindle, and, by sliding on the spindle projection, moves into an inclined position in which there is a possibility of endangering the locking connection between the detents and the notches associated with the housing, these notches being predominantly in the form of a so-called thrust collar with internal teeth. There would then be a danger that the belt winding spindle would no longer be blocked and the safety belt wearer would no longer be held in position, with the possibility of serious injury.

It is therefore an object of the present invention to improve a roll-up device for safety belts with the features mentioned hereinbefore in such a way as to prevent the locking member from breaking out. At the same time, the loading capacity of the system should be increased while its overall dimensions are restricted.

These objects, and other objects and advantages of the present invention, will appear more clearly from the following specification in connection with the accompanying drawings, in which.

The roll-up device of the present invention is characterized primarily in that, between the projection on the belt winding spindle, and the radially deflectable locking member, there is provided at least one overlapping arrangement, which acts in such a way that during blocking, the locking member does not move out of its intended position in the axial direction of the belt winding spindle.

According to specific embodiments of the present invention, the overlapping arrangements may be provided in pairs which are substantially rotationally symmetrical. For example, mounted on the inner edge of the central opening of the locking member there may be two protrusions which project inwardly on alternate sides, and which engage over and/or under widened or narrowed portions of the projection of the belt winding spindle in the blocking position.

Alternatively, on the projection of the belt winding spindle, there may be mounted two protrusions which project outwardly on alternate sides, and which engage over and/or under profile sections of the locking member in the blocking position.

The projection of the belt winding spindle may have an opening located in the mounting area of the locking member; this opening constitutes the reduction in cross section, and the protrusions of the locking member engage in it in the event of blocking. The locking member as a whole may be mounted in such a way as to pass transversely through the opening in the projection of the belt winding spindle.

The belt winding spindle may comprise a flat steel core which is surrounded by a drum-shaped profile member, especially one made of plastic; the projection with the opening may be integrally formed as one end of the flat steel core. The other end of the flat steel core may be dovetailed, and preferably the two tips of the dovetail extend beyond the width of the steel core. In an axially integral configuration, an extension of the steel core may be provided in the center of the dovetail as a tang for the return feed spring.

The opening in the projection of the belt winding spindle or of the steel core may be of elongate rectangular construction, with the long sides extending at right angles to the spindle axis.

The projection integrally formed on the steel core may comprise, at its free end, two diametrically arranged cams which project beyond the width of the projection and, in the blocking position, engage over or overlap corresponding edge portions of the central opening in the locking member.

The locking member, formed for example, as a ratchet wheel stamped out of sheet steel, may have a central opening with a contour which is large enough in one area to enable the projection of the belt winding spindle to be passed freely through it, while in an adjacent area it is so much smaller that the projection is still pivotally movable therein, but the cams engage over or overlap this area.

The central opening of the locking member may have a keyhole-shaped contour, and the projection of the belt winding spindle may have a corresponding profile, with the projection being provided, on both sides of the spindle axis, with flaps on opposite sides, which flaps, in the blocking position engage over corresponding overlap portions of the locking member on the edge of the central opening. The contour of the keyhole-shaped central opening of the locking member, in the region of the shank of the key, may have a cutout the same size as the associated flap on the projection, so that the central opening of the locking member is freely movable over the projection in the rest position.

The locking member may be eccentrically mounted on a pin, on the end face of the belt winding spindle at right angles to the projection, and in the rest position may abut, with at least one abutment surface of the inner edge of its central opening, on the projection.

A single projection may be mounted on the inner edge of the central opening of the locking member; this projection may engage in an appropriately dimensioned recess in the projection when the parts are in the blocking position.

On the inner edge of the central opening of the locking member, there may be provided not only protrusions for engaging in recesses or an opening in the projection of the belt winding spindle, but also, on the projection, protrusions, flaps, or the like for engaging over or overlapping edge portions of the central opening in the blocking position.

The locking member, formed as a flat disc, may pass through the projection by means of the opening therein, may be rotatably mounted on one side of the projection, and on the other side of the projection may be provided with the at least one detent. The locking member may be provided with an abutment contour, for the rest position, on the side opposite its radially deflectable mounting. The locking member may be provided with two abutment contours, which are offset at an angle, for the transmission of force to the projection of the belt winding spindle, with one abutment being located inside the opening in the projection in the blocking position, while the other abutment is mounted on the locking member in such a way that it comes into contact with an outside surface of the projection, and is preferably located on the side of the locking member which carries the detents. A third abutment may be mounted on the locking member, and may be located diametrically symmetrically opposite the abutment which comes into contact with the outside of the projection, with this third abutment also coming into contact with the outside of the projection, preferably on the side nearest the mounting of the locking member.

One advantage of the invention is that, due to the matching configuration of the spindle projection and locking member, not only does the belt blocking mechanism respond as quickly as possible but also, in addition to the locking action in the radical direction, a locking action is also obtained in the axial direction, in relation to the axis of the belt winding spindle, thus intensifying the blocking action of the entire system. The invention not only leads to an increase in the calculated breaking load, but also helps to overcome the tendency of the housing to warp, and it also permits a high torque transmission and makes it possible to adopt measures which help to reduce noise in the belt roll-up device.

Figure 1:
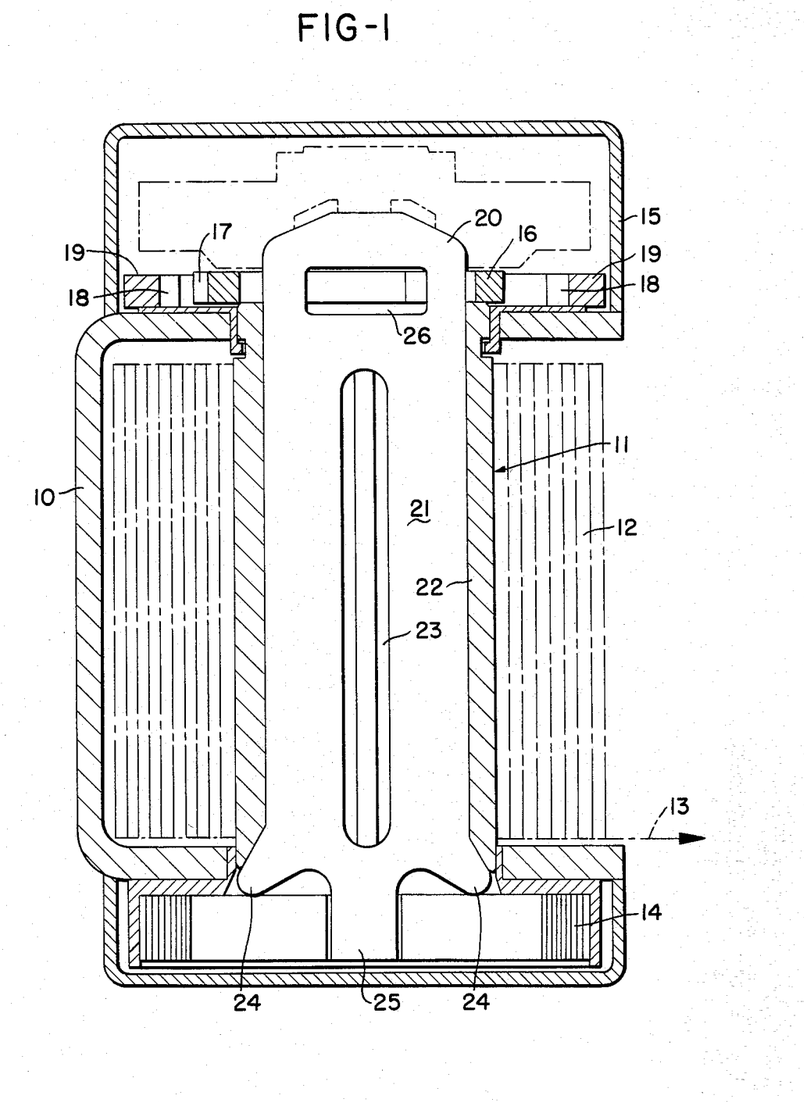
FIG. 1 is a longitudinal section through one embodiment of an inventive automatic belt roll-up or reeling device for safety belts, and is taken along the axis of the belt winding spindle.
Figure 2:
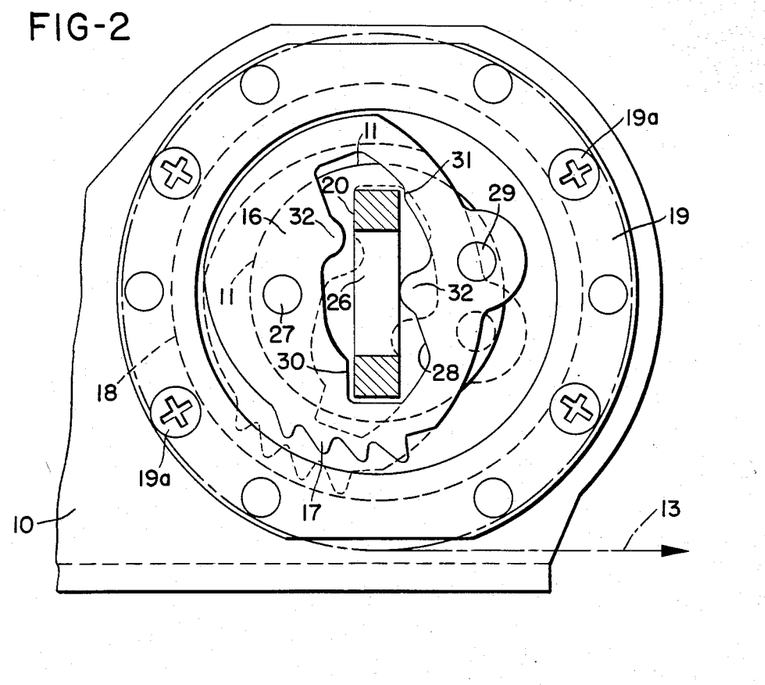
FIG. 2 is a cross section in the plane of the locking member.

Referring now to the drawings in detail, FIGS. 1 and 2 show the basic construction of the roll-up device. Mounted in a U-shaped housing 10 is a belt winding spindle 11, on which the belt 12 of the safety belt can be wound in several layers. In order to put on the belt, the user pulls the belt out of the roll-up device in the usual way (arrow 13); the belt is unwound from the spindle 11, and sets the spindle 11 rotating counter to the force of a return feed spring 14. At the so-called operational end, which is opposite the return feed spring 14, and under a cover 15, are housed the components which cause blocking of the belt winding spindle 11, and thereby make the restraining system effective, by preventing the safety belt 12 from being pulled further out of the apparatus in the direction of the arrow 13. The blocking of the spindle may be triggered in a conventional manner, either as a safety belt-sensitive action or as a vehicle-sensitive action. A locking member 16 with detents 17 engages in the teeth 18 of a thrust collar 19 which has internal teeth and is fixedly connected to the housing 10. The locking member 16 is in the form of a disc stamped out of sheet steel, and is connected, in a manner to be described hereinafter, to a projection 20 on the belt winding spindle 11 in such a way that, when blocking occurs, a chain of frictional connections is formed from the thrust collar 19 via the ratchet wheel 16 to the projection 20 and hence to the spindle 11.

In the embodiments shown, the belt winding spindle 11 comprises a flat steel core 21 which is mounted in a drum-like formed or profiled member 22 made of plastic. The steel core 21 has an axially parallel longitudinal slot 23 for securing the end of the belt to the spindle 11. At the end nearest the return feed spring 14, the end of the steel core 21 located there is dovetailed with substantially triangular extensions 24 which, in the embodiment shown in FIG. 1, project beyond the width of the steel core 21. A tang 25 for the return feed spring 14 is disposed in an axially integral configuration in the center between the extensions 24. The projection 20 of the steel core 21, which projection is located at the operational end of the apparatus, merges integrally with the steel core 21; however, embodiments are also possible wherein the projection 20 is an originally separate component which is fixedly secured to the belt winding spindle 11. In such a case, the spindle need not contain a steel core, and the projection need not be flat-rectangular in cross section in the manner of a stamped part.

FIG. 2 shows the operational end of the device in plan view, with the thrust collar 19 secured to the housing 10 by means of screws 19a, with the ratchet wheel 16 having four teeth 17, and with a cross section through the projection 20 of the belt winding spindle 11. At the point where the section is taken, this projection is provided with an elongate rectangular opening 26. The ratchet wheel 16 has an irregular shape, and includes a bearing pin 27 in the form of an embossed portion by means of which the ratchet wheel is pivotally mounted in a bore (not shown) on the associated end face of the belt winding spindle 11. Consequently, the bearing point of the ratchet wheel 16 rotates with the spindle 11 in one or the other direction of rotation, depending on whether the belt 12 is being unwound or wound up. The bearing pin 27 is located precisely at right angles to the side of the projection 20 on a diametrical line through the end face of the spindle.

In its central region, the ratchet wheel 16 has an opening 28, here referred to as the central opening, through which the projection 20 projects and in which it can occupy different operational positions. On that side of the ratchet wheel 16 opposite the bearing pin 27, there is provided a second pin 29 which projects beyond the ratchet wheel 16 in the opposite direction to the pin 27, and is provided in the conventional manner for establishing a functional connection with the vehicle-sensitive system (not shown in the drawings).

Figure 3:
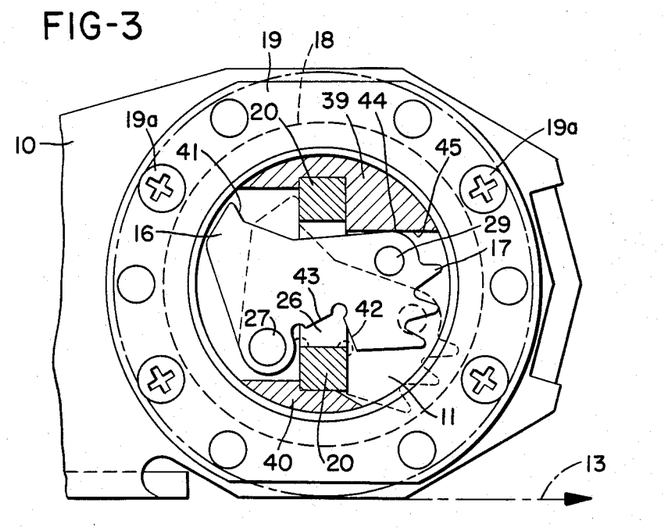
FIG. 3 is another embodiment viewed as in FIG. 2.
Figure 8:
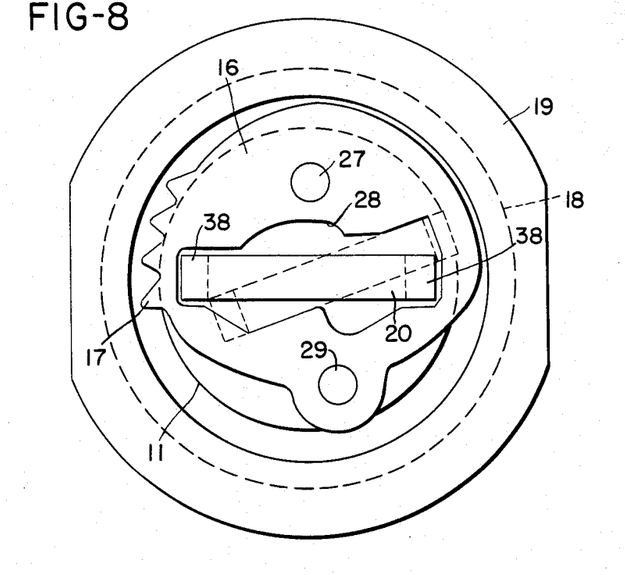
FIG. 8 shows another embodiment, viewed as in FIG. 6.

The ratchet wheel 16 is able to pivot about the bearing pin 27, thus causing radial deflection of the detents 17 until they engage in the teeth 18 of the thrust collar 19. The deflection starts either as a belt-sensitive operation, as a function of the acceleration in rotation of the belt winding spindle 11, or as a vehicle-sensitive operation, caused by the exertion of a force on the pin 29; in another embodiment, the belt-sensitive system may also act on the pin 29 via a special inertial mass. During the movement of deflection of the ratchet wheel 16, the projection 20 in the internal space of the central opening 28 moves from a first or rest position into a second or blocking position. In FIGS. 2, 3 and 8, the rest position is shown by solid lines, and the blocking position by broken lines. While it is in the rest position, in which the ratchet wheel 16 can rotate freely in the inner space of the thrust collar 19 and its teeth 18, without having its detents 17 engage in the teeth of the thrust collar 19, the spindle projection 20 abuts, on the one hand, on a right-angled guide edge 30 and, on the other hand, diagonally opposite, on another guide edge 31 of the central opening 28. Moreover, the ratchet wheel 16 is mounted with its central opening 28 over the projection 20 in such a way that it can be moved from the projection 20 without any obstruction, which is also necessary for assembly. However, in the event of blocking, this could cause the ratchet wheel 16 to break out by sliding over the projection 20, and could thus lead to lateral slipping of the detents 17 from the teeth 18. To prevent this, the following measures are adopted:

The central opening 28 has projections or cams 32 integrally formed on its opposite longitudinal sides; these cams 32 project so far into the internal space of the opening 28 that, when the ratchet wheel 16 is pivoted out into the blocking position from the appropriate side, they are displaced in such a way that a certain proportion of their surface moves into the transverse slot-shaped opening 26 in the projection 20. This position is shown by broken lines in FIG. 2. This produces additional blocking or locking of the ratchet wheel 16 on the belt winding spindle 11 with its projection 20 in the direction of the spindle axis, with the attendant effect that the ratchet wheel 16 is unable to leave its predetermined position relative to the projection 20, i.e. it cannot break out. Thus, the danger of the detents 17 slipping away from the teeth 18 of the thrust collar 19 is averted. As soon as the ratchet wheel 16 returns to the rest position under the influence of conventional means, e.g. a spring, the projection or cams 32 no longer overlap with the opening 26 (continuous lines).

Figure 6:
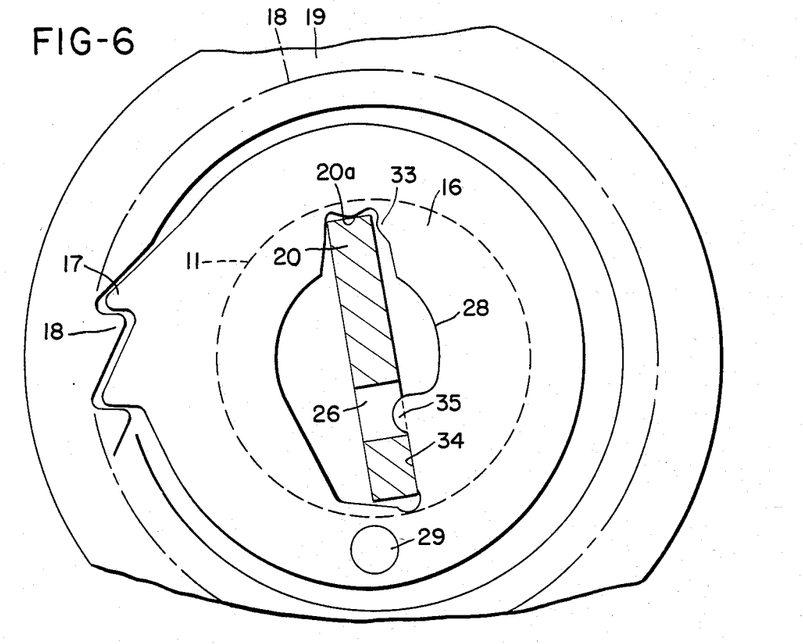
FIG. 6 shows another embodiment of the spindle projection and locking member with the thrust collar, shown in a simplified plan view.
Figure 7:
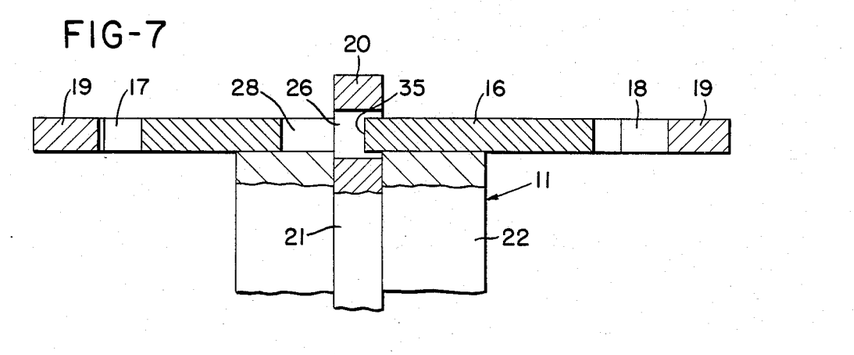
FIG. 7 shows a diametric cross section through the subject matter of FIG. 6.

A similar embodiment of the spindle projection and ratchet wheel to that shown in FIGS. 1 and 2 is illustrated in FIGS. 6 and 7. Again, the ratchet wheel 16 is located, by means of its central opening 28, over the spindle projection 20. One difference between this embodiment and that described hereinbefore, however, is that the ratchet wheel 16 in this case is not mounted on a bearing bolt so as to be capable of being deflected; instead, the radially deflectable mounting of the ratchet wheel 16 is obtained by using the outer edge 20a of the projection 20 as a point of rotation for the ratchet wheel 16. For this purpose, the central opening 28 is shaped so as to fit closely around the outer edge 20a at 33 so as to enable the ratchet wheel 16 to pivot back and forth about the projection 20. The central opening 28 widens, in a sector shape, sufficiently to permit the pivoting movement mentioned above. FIG. 6 shows the blocking position of the system, and here the projection 20 is resting with part of its outer surface on one edge 34 of the opening 28, so as to ensure a reliable transmission of force from the spindle 11 via the projection 20, ratchet wheel 16 and detents 17 thereof, to the thrust collar 19 with its teeth 18.

In this case, the axial locking of the ratchet wheel 16 and projection 20 is effected by means of a lug 35 formed on the inner contour of the opening 28; in the blocking position, this lug projects into the opening 26 in the spindle projection 20. The opening 26 in this embodiment is smaller than in FIGS. 1 and 2. When the projection 20 in the opening 28 pivots back into the rest position (from right to left in FIG. 6), the opening 26 releases the lug 35 so that the ratchet wheel 16 and projection 20 no longer overlap.

Whereas in the embodiments according to FIGS. 1, 2, 6 and 7 the overlapping between the ratchet wheel 16 and the spindle projection 20 occurs in such a way that the protrusions 32, 35 on the ratchet wheel 16 engage in the contour of the projection 20 (by means of the opening 26 therein), FIGS. 4, 5, 8 and 9 show embodiments wherein the situation is reversed, i.e. the protrusions designed to overlap are located on the spindle projection 20 and have a locking action on regions within the contour of the ratchet wheel 16 in question.

Figure 4:
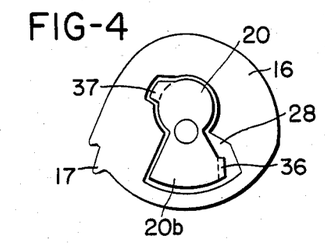
FIG. 4 is another embodiment of the spindle projection and the locking member in the rest position.
Figure 5:
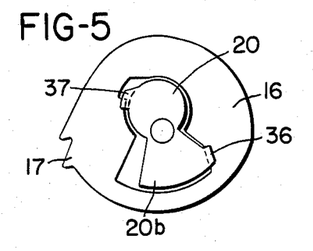
FIG. 5 shows the subject matter of FIG. 4 in the blocking position.

FIGS. 4 and 5 show a ratchet wheel 16 and a spindle projection 20 in two different operational positions (rest position in FIG. 4 and blocking position in FIG. 5), corresponding in configuration to British Pat. No. 1517716. The central opening 28 in the ratchet wheel 16 has a keyhole-shaped contour; the profile of the spindle projection 20 is also substantially keyhole-shaped, while the part 20b corresponding to the key bit is sectorally smaller than the associated part of the central opening 28, so that the part 20b can pivot back and forth in the opening 28 in the ratchet wheel 16. For the purpose of causing the parts 16, 20, 20b to overlap partially as described hereinbefore, a flap 36 is integrally formed on one side of the part 20b of the spindle projection; this flap projects over a corresponding overlap area on the edge of the central opening 28 in the ratchet wheel 16 in the blocking position (FIG. 5). Mounted on the projection 20, diametrically opposite the flap 36, is another flap 37 which also provides an overlap with the ratchet wheel 16 in the blocking position, with the contour of the central opening 28 in the ratchet wheel 16 having a corresponding recess for the flap 37 in the rest position, as shown in FIG. 4. To enable the two flaps 36, 37 to slide over the surface of the ratchet wheel 16 when the blocking position is assumed, the spindle projection 20 is somewhat thicker than the ratchet wheel 16, and the flaps project only in that portion of the projection 20 which is thicker than the ratchet wheel 16. The construction shown in FIGS. 4 and 5 also has the effect of not only producing a radial blocking, but also axially blocking the ratchet wheel 16 on the projection 20, thereby preventing the ratchet wheel 16 from breaking out of its predetermined position in the event of blockage.

Figure 9:
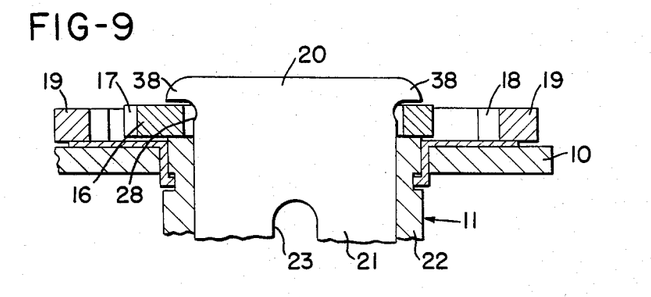
FIG. 9 shows a diametric cross section through the subject matter of FIG. 8.

According to FIGS. 8 and 9, the belt winding spindle 11 is again provided with a steel core 21 which comprises, as an integral extension, a projection 20 which extends through the central opening 28 in the associated ratchet wheel 16. At its free end, the projection has two radially protruding tabs 38 which travel over corresponding overlap portions of the ratchet wheel 16 at the edge of the contour of the central opening 28, when the parts are in the blocking position, and thereby provide the desired axial locking of the associated parts.

A comparatively greatly modified embodiment is shown in FIG. 3 of the drawings, and here again the situation is reversed, in that the blocking member 16 does not have a central opening through which the projection 20 of the belt winding spindle 11 extends, but rather this projection 20 has an opening through which the locking member 16 passes. However, the purpose and effect of these associated components are not altered, but again, in this embodiment, in addition to the radial deflection of the locking member 16 with corresponding blocking, there is additional axial blocking, so that the blocking member 16 cannot leave its predetermined position in the system if it is subjected to high loads in the event of a crash. A particular advantage of this embodiment is that a comparatively compact construction can be obtained.

As can be seen from FIG. 3, the thrust collar 19 is secured to the housing 10 on the outside by means of cross-slotted or Phillips screws 19a; its inner teeth are indicated by the broken line 18. The circular cross section of the associated end of the belt winding spindle 11 rotates in the inner space of the thrust collar 19. Projecting over the end of the spindle is the projection 20 which, here again, is formed as an integral component of a steel core 21. The projection 20 has an opening 26 of elongate rectangular shape; this opening may also be referred to as a window. Extending at right angles through this window is the ratchet wheel 16, which is suitably contoured for this purpose, with its detents 17. As in the embodiment shown in FIGS. 1 and 2, the ratchet wheel 16 has a punched-out bearing bolt 27 which is mounted diametrically at right angles to the plane of the projection 20 on the end face of the spindle 11. The ratchet wheel 16 can be deflected radially about this mounting, so that its detents 17 can engage in the teeth 18 of the thrust collar 19. The engaged position is indicated by broken lines. The connection with the vehicle-sensitive and/or belt-sensitive system is effected by means of the pin 29. This latter system is fixed by means of axially parallel extensions 39, 40 of the drum-shaped spindle portion 22 made of plastic, in the center of which is mounted the steel core 21.

The ratchet wheel 16 comprises three abutment surfaces 41, 42, 43 by means of which, in the blocking position (shown by broken lines), a particularly close transmission of force between the projection 20 and the ratchet wheel 16 is ensured. The ratchet wheel 16 abuts with these abutments not only on each side of the projection 20, but also at right angles thereto inside the window 26, on the projection and hence on the belt winding spindle. In the rest position shown by solid lines in FIG. 3, the ratchet wheel 16 rests at 44 against a surface 45 of the plastic rib 39, resulting in a corresponding noise attenuation, by virtue of the fact that unavoidable tiny movements of the ratchet wheel 16, for example when the vehicle is travelling over cobblestones, are made harmless from the point of view of noise. This principle can be implemented in virtually all the embodiments.

Figure 10:
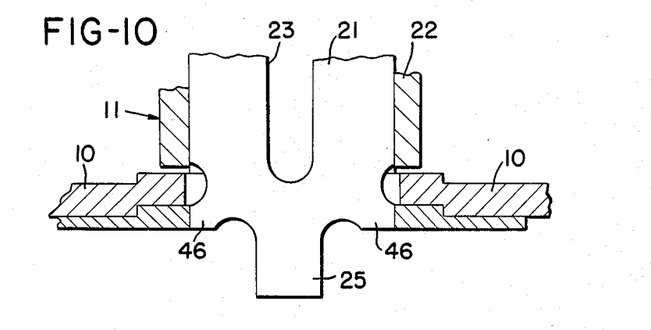
FIG. 10 is a view of the dovetailed steel core of the belt winding spindle of an embodiment modified in relation to FIG. 1.

Finally, FIG. 10 shows a modified embodiment of the construction and mounting of the spindle at the end nearest the return feed spring 14 of the roll-up device. Here again, the steel core 21 of the belt winding spindle 11 is substantially dovetailed but the tips 46 of the dovetail do not project beyond the outer dimensions of the steel core 21. The tips 24, 46 of the dovetail become embedded in the adjacent material of the mounting, especially plastic, when subjected to load in the direction of the arrow 13, and thus clamp the belt winding spindle 11 against the housing 10, thereby absorbing a not inconsiderable proportion of the axial forces which, as such, tend to move the spindle 11 towards the operational end and help to make the ratchet wheel 16 break out of the thrust collar 19. Thus, here again, the desired effect of preventing axial displacement of the belt winding spindle 11 in the event of high stress is achieved, thereby increasing the efficiency of the axial locking at the operational end.

The present invention is, of course, in no way restricted to the specific disclosure of the specification and drawings, but also encompasses any modifications within the scope of the appended claims.

What we claim is:

1. A roll-up device for a safety belt, said device providing automatic blocking of a belt winding spindle in the event acceleration exceeding a threshold value acts on the belt and/or on a support for the roll-up device, said device comprising:

a housing, notches being associated with said housing;

a belt winding spindle having two ends and being mounted in said housing in such a way as to be rotatable relative thereto, said belt being wound on and unwound from said belt winding spindle;

a projection provided on one end of said belt winding spindle and having a free end remote from said spindle;

a radially deflectable locking member operatively associated with said belt winding spindle via said projection thereof, said locking member and said projection cooperating to permit said spindle to assume at least two different operating positions, namely a blocked position, and a rest position which permits said winding and unwinding of said belt; said locking member being provided with at least one detent for engaging said notches of said housing to thereby lock said locking member in a blocking position and hence effect said blocking of said belt winding spindle in its blocked position; and at least one radially overlapping arrangement operatively associated with, and radially provided between, said locking member and said projection of said spindle, said radially overlapping arrangement acting at least temporarily in said blocked position of said belt winding spindle as to prevent movement of said locking member out of its intended position in the axial direction of said spindle, said projection of said belt winding spindle being provided with an opening of elongate rectangular construction, with the long sides of said opening extending at right angles to the axis of said spindle.

2. A belt roll-up device according to claim 1, in which said locking member is provided with a central opening, and in which said projection of said belt winding spindle engages in said central opening.

3. A belt roll-up device according to claim 2, in which said overlapping arrangements are provided in pairs which are substantially rotationally symmetrical.

4. A roll-up device for a safety belt, said device providing automatic blocking of a belt winding spindle in the event acceleration exceeding a threshold value acts on the belt and/or on a support for the roll-up device, said device comprising:

a housing, notches being associated with said housing;

a belt winding spindle having two ends and being mounted in said housing in such a way as to be rotatable relative thereto, said belt being wound on and unwound from said belt winding spindle;

a projection provided on one end of said belt winding spindle and having a free end remote from said spindle;

a radially deflectable locking member operatively associated with said belt winding spindle via said projection thereof, said locking member and said projection cooperating to permit said spindle to assume at least two different operating positions, namely a blocked position, and a rest position which permits said winding and unwinding of said belt; and locking member being provided with at least one detent for engaging said notches of said housing to thereby lock said locking member in a blocking position and hence effect said blocking of said belt winding spindle in its blocked position; and at least one radially overlapping arrangement operatively associated with, and radially provided between, said locking member and said projection of said spindle, said radially overlapping arrangement acting at least temporarily in said blocked position of said belt winding spindle as to prevent movement of said locking member out of its intended position in the axial direction of said spindle, said locking member being provided with a central opening, and said projection of said belt winding spindle engaging in said central opening, said overlapping arrangements being provided in pairs which are substantially rotationally symmetrical, said projection of said belt winding spindle being provided with a further opening in the vicinity of said locking member; said overlapping arrangement including two protrusions mounted on alternate sides of an inner edge of said central opening of said locking member and projecting inwardly, said protrusions, in said blocked position, projecting into said opening of said projection of said spindle.

5. A roll-up device for a safety belt, said device providing automatic blocking of a belt winding spindle in the event acceleration exceeding a threshold value acts on the belt and/or on a support for the roll-up device, said device comprising:

a housing, notches being associated with said housing;

a belt-winding spindle having two ends and being mounted in said housing in such a way as to be rotatable relative thereto, said belt being wound on and unwound from said belt winding spindle;

a projection provided on one end of said belt winding spindle and having a free end remote from said spindle;

a radially deflectable locking member operatively associated with said belt winding spindle via said projection thereof, said locking member and said projection cooperating to permit said spindle to assume at least two different operating positions, namely a blocked position, and a rest position which permits said winding and unwinding of said belt; said locking member being provided with at least one detent for engaging said notches of said housing to thereby lock said locking member in a blocking position and hence effect said blocking of said belt winding spindle in its blocked position; and at least one radially overlapping arrangement operatively associated with, and radially provided between, said locking member and said projection of said spindle, said radially overlapping arrangement acting at least temporarily in said blocked position of said belt winding spindle as to prevent movement of said locking member out of its intended position in the axial direction of said spindle, said locking member being provided with a central opening, and said projection of said belt winding spindle engaging in said central opening, said projection of said belt winding spindle being provided with an opening in the vicinity of said locking member; said overlapping arrangement including at least one protrusion on said locking member, which protrusion, in said blocked position, projects into said opening of said projection of said spindle.

6. A roll-up device for a safety belt, said device providing automatic blocking of a belt winding spindle in the event acceleration exceeding a threshold value acts on the belt and/or on a support for the roll-up device, said device comprising:

a housing, notches being associated with said housing;

a belt winding spindle having two ends and being mounted in said housing in such a way as to be rotatable relative thereto, said belt being wound on and unwound from said belt winding spindle;

a projection provided on one end of said belt winding spindle and having a free end remote from said spindle;

a radially deflectable locking member operatively associated with said belt winding spindle via said projection thereof, said locking member and said projection cooperating to permit said spindle to assume at least two different operating positions, namely a blocked position, and a rest position which permits said winding and unwinding of said belt; said locking member being provided with at least one detent for engaging said notches of said housing to thereby lock said locking member in a blocking position and hence effect said blocking of said belt winding spindle in its blocked position; and at least one radially overlapping arrangement operatively associated with, and radially provided between, said locking member and said projection of said spindle, said radially overlapping arrangement acting at least temporarily in said blocked position of said belt winding spindle as to prevent movement of said locking member out of its intended position in the axial direction of said spindle, said projection of said belt winding spindle being provided with an opening; said overlapping arrangement being provided by said locking member itself, which as a whole is mounted in such a way as to pass transversely through said opening in said projection.

7. A belt roll-up device according to claim 4, in which said belt winding spindle comprises a flat steel core having two ends and surrounded by a drum-shaped profile member, with said projection of said spindle being provided with an opening and being integrally formed as one of said ends of said flat steel core.

8. A belt roll-up device according to claim 7, in which the other end of said flat steel core remote from said projection is dovetailed, having two tips.

9. A belt roll-up device according to claim 8, in which said two tips of said dovetail extend beyond the width of said steel core.

10. A belt roll-up device according to claim 8, which includes a return feed spring operatively associated with that end of said flat steel core remote from said projection; and in which said steel core is provided with an axially integral extension in the center of said dovetail as a tang for said return feed spring.

11. A belt roll-up device according to claim 1, in which said locking member is eccentrically mounted on a pin on that each of said belt winding spindle which is provided with said projection, and is mounted at right angles to said projection; and in which the inner edge of said central opening of said locking member includes at least one abutment surface which abuts on said projection in said rest position.

12. A roll-up device for a safety belt, said device providing automatic blocking of a belt winding spindle in the event acceleration exceeding a threshold value acts on the belt and/or on a support for the roll-up device, said device comprising:
a housing, notches being associated with said housing;
a belt winding spindle having two ends and being mounted in said housing in such a way as to be rotatable relative thereto, said belt being wound and unwound from said belt winding spindle;
a projection provided on one end of said belt winding spindle and having a free end remote from said spindle;
a radially deflectable locking member operatively associated with said belt winding spindle via said projection thereof, said locking member and said projection cooperating to permit said spindle to assume at least two different operating positions, namely a blocked position, and a rest position which permits said winding and unwinding of said belt; said locking member being provided with at least one detent for engaging said notches of said housing to thereby lock said locking member in a blocking position and hence effect said blocking of said belt winding spindle in its blocked position; and
at least one radially overlapping arrangement operatively associated with, and radially provided between, said locking member and said projection of said spindle, said radially overlapping arrangement acting at least temporarily in said blocked position of said belt winding spindle as to prevent movement of said locking member out of its intended position in the axial direction of said spindle, said locking member being provided with a central opening, and said projection of said belt winding spindle engaging in said central opening, said projection of said belt winding spindle is provided with an opening; and in which said overlapping arrangement includes a single projection mounted on the inner edge of said central opening of said locking member, said single projection, in said blocked position, projecting into said opening of said projection of said spindle.

13. A roll-up device for a safety belt, said device providing automatic blocking of a belt winding spindle in the event acceleration exceeding a threshold value acts on the belt and/or on a support for the roll-up device, said device comprising:
a housing, notches being associated with said housing;
a belt winding spindle having two ends and being mounted in said housing in such a way as to be rotatable relative thereto, said belt being wound on and unwound from said belt winding spindle;
a projection provided on one end of said belt winding spindle and having a free end remote from said spindle;
a radially deflectable locking member operatively associated with said belt winding spindle via said projection thereof, said locking member and said projection cooperating to permit said spindle to assume at least two different operating positions, namely a blocked position, and a rest position which permits said winding and unwinding of said belt; said locking member being provided with at least one detent for engaging said notches of said housing to thereby lock said locking member in a blocking position and hence effect said blocking of said belt winding spindle in its blocked position; and
at least one radially overlapping arrangement operatively associated with, and radially provided between, said locking member and said projection of said spindle, said radially overlapping arrangement acting at least temporarily in said blocked position of said belt winding spindle as to prevent movement of said locking member out of its intended position in the axial direction of said spindle, said projection of said belt winding spindle being provided with an opening; said overlapping arrangement being provided by said locking member itself, which as a whole is mounted in such a way as to pass transversely through said opening in said projection, said locking member being a flat disc having portions thereof located on both sides of said projection of said belt winding spindle, a portion of said locking member being rotatably mounted on one side of said projection, with that portion of said locking member located on the other side of said projection being provided with said at least one detent.

14. A belt roll-up device according to claim 13, in which that side of said locking member opposite the radially deflectable mounting thereof is provided with an abutment for said rest position.

15. A belt roll-up device according to claim 13, in which said locking member is provided with a first and second abutment, which are offset at an angle, for transmitting force to said projection of said belt winding spindle; with said first abutment being located inside said opening of said projection in said blocked position; and with said second abutment being mounted on said locking member in such a way that it comes into contact with an outside surface of said projection in said blocked position.

16. A belt roll-up device according to claim 15, in which said second abutment is located on that portion of said locking member which is provided with said at least one detent.

17. A belt roll-up device according to claim 15, in which said locking member is provided with a third abutment located diametrically symmetrically opposite said second abutment and also coming into contact with an outside surface of said projection in said blocked position.

18. A belt roll-up device according to claim 17, in which said third abutment is located on the rotatably mounted portion of said locking member.

* * * * *